Dec. 20, 1960    W. B. GUGGI    2,965,766
VOLTAGE TO PULSE-WIDTH CONVERSION DEVICE
Filed April 19, 1955

INVENTOR
Walter B. Guggi

BY
Paul E. Friedemann
ATTORNEY

United States Patent Office 2,965,766
Patented Dec. 20, 1960

2,965,766

VOLTAGE TO PULSE-WIDTH CONVERSION DEVICE

Walter B. Guggi, Snyder, N.Y., assignor to Westinghouse Electric Corporation, East Pittsburgh, Pa., a corporation of Pennsylvania Filed Apr. 19, 1955, Ser. No. 502,470

6 Claims. (Cl. 307—88.5)

This invention relates generally to electrical translation devices, and more particularly to devices for generating pulses, the time duration of which is functionally related to the magnitude of a reference voltage.

There exists in the art a requirement for a simple, rugged and temperature stable device for producing pulses having time duration which is preferably a linear function of the amplitude of a variable control voltage. A system requiring such a device is that illustrated in my copending application, Serial No. 506,474, for Motor Control System, filed May 6, 1955, now Patent No. 2,767,365. Prior art devices meant to accomplish this function have been found to exhibit a number of disadvantages such as extreme complexity in circuitry, sensitivity to variations in operating temperature, fragility, limitation in the percentage of pulse-width modulation obtainable, and variations from true linearity in the pulse duration-applied control voltage relationship thereof. A typical example of the prior art of this nature may be found in Modulation Theory by H. S. Black, chapter 17 (Van Nostrand, 1954). An additional shortcoming of prior art devices of this nature is their inability to directly add or subtract a plurality of direct current reference signals when the sources thereof are connected to a common point. Resort has had to be made to such crude expedients as converting the D.-C. signals to A.-C. signals of proportional amplitude, and adding the magnitudes of the A.-C. signals by means of transformers. The disadvantages attendant upon expedients of this nature add to the complexity of the circuitry and the inaccuracy of the results obtained from the overall system. Other devices known to the prior art, such as that exemplified by U.S. Patent No. 2,441,418 to W. D. Houghton, are fairly simple in structure but permit less than 50 percent pulse-width modulation, and additionally often require the use of an expensive differentiating transformer.

An object of this invention is to provide a voltage to pulse-width conversion device having improved operating characteristics and of extreme circuit simplicity.

Another object is to provide a voltage to pulse-width conversion device of simple design having a minimum number of circuit components while permitting linear pulse-width modulation between zero and 100 percent modulation as a function of control voltage magnitude or of control current magnitude.

Still another object is to provide a pulse-width modulation device which is relatively temperature insensitive over wide variations in the ambient temperatures of the operating components thereof.

Yet another object is to provide a triangular wave generator, particularly adapted to be used in a pulse-width modulator.

A further object is to provide an extremely simple triangular wave generator having extremely rugged, long-lived circuit components.

Other objects and features of my invention will become readily apparent upon consideration of the following description thereof when taken in connection with the accompanying drawings, wherein:

Figure 1 is a schematic diagram of one embodiment of my invention.

Figs. 2a and 2b are respectively coordinate presentations of emitter-collector voltage as a function of collector current of two junction type transistors utilized in the embodiment of Fig. 1 for various base currents. Fig. 2c is a coordinate presentation of collector current of one of the junction transistors in the embodiment of Fig. 1 as a function of time. It is to be noted that the coordinate presentation utilized with respect to Figs. 2a, 2b and 2c is the reverse of that normally used, particularly in Fig. 2c, wherein time is the ordinate and collector voltage is the abscissa.

According to one aspect of my invention, a pair of constant current devices are serially connected across a D.-C. bias source. The constant current devices may be either pentode vacuum tubes, junction transistors, or like devices having a characteristic such that the current magnitude at which the device reaches current saturation is controlled by the voltage imposed on a control electrode thereof, and is practically independent of the supply voltage. A reference voltage is imposed on the control electrode of one constant current device and a sawtooth voltage (preferably a voltage of generally triangular waveform) on the control electrode of the second constant current device. As the voltage on the control electrode of the second constant current device increases from its minimum value, the current through the devices will be limited to that current which the second constant current device alone will pass; practically all of the voltage available from the D.-C. source will appear across the first device, inasmuch as its impedance is a small fraction of that of the second device. When the control voltage reaches the value at which the first device will begin limiting current flow through the series circuit, there will be a reversal of the voltage drop across the two devices. After the sawtooth voltage reaches its peak and decreases to the voltage at which the second device again begins limiting, there will be another voltage reversal such that the waveform of the voltages appearing across the individual constant current devices are essentially rectangular waves which are in phase opposition and oppositely variable in pulse width. The time duration of the rectangular waves is controlled by varying the voltage on the control electrode of the first constant current device. This varies the time in the cycle of the sawtooth generator at which the first device begins current limiting and thus the duration of the rectangular pulses.

Another aspect of my invention involves an extremely simple sawtooth generator that produces an output voltage of essentially triangular waveform which is particularly advantageous for use with junction transistor constant current devices. A pair of full wave rectifiers are coupled to a sinusoidal A.-C. source to derive rectified voltages of opposite polarities. The output voltage of one rectifier is filtered by means of a simple capacitive filter; the output voltages of the filter and the other rectifier are combined by means of a resistive mixer. The gain of a junction transistor decreases with increasing base-emitter voltage; the waveform derived from the resistive mixer is of a form which tends to compensate for the variation of transistor gain, when transistors are utilized as constant current devices in the pulse-width modulator in the manner described above, so that the waveform of the output current therefrom is more nearly a perfect triangular wave.

Figure 1:
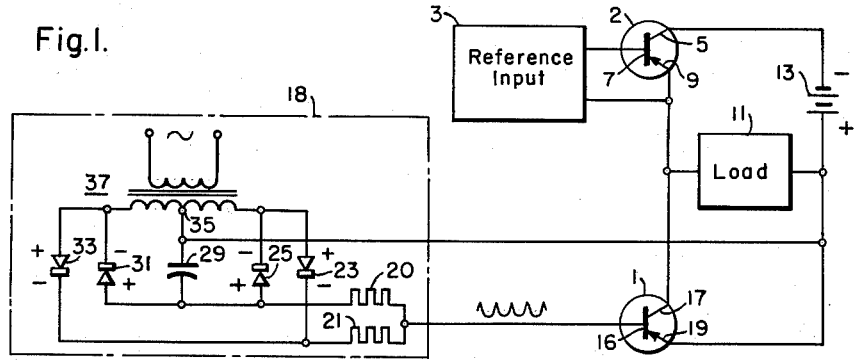

With reference now to the embodiment of my invention depicted in Fig. 1 of the drawings, there is shown a pair of constant current devices 1 and 2 which are preferably p-n-p junction type transistors, as shown. The collector 17 of transistor 1 is connected directly to emitter 9 of transistor 2; the emitter 19 of transistor 1 and collector 5 of transistor 2 are respectively connected to the positive and negative terminals of D.-C. supply source 13. A high impedance load 11, which may be any device that requires a rectangular wave voltage for actuation, is shown coupled between the emitter 19 and collector 17 of transistor 1. As will become evident, the load may be coupled between the emitter 9 and collector 5 of transistor 2. This load is preferably an amplifier, such as a grounded collector transistor stage, to provide high input impedance and sufficient output power to drive a circuit requiring on-off control.

A reference voltage source 3 is connected between base 7 and emitter 9 of transistor 2 and a control source 18, the output of which is a sawtooth, preferably of generally triangular waveform, for reasons that will become evident below, is connected between base 16 and emitter 19 of transistor 1. The output of reference source 3 may be either an A.-C. or a D.-C. voltage. If the reference voltage is A.-C., its frequency should be relatively low with respect to that of the sawtooth voltage output of source 18.

The preferred sawtooth voltage generator 18 depicted in Fig. 1 comprises a transformer 37, the primary of which is adapted to be coupled to a sinusoidal A.-C. source. The secondary of transformer 37 is connected to a first full wave rectifier comprising half wave rectifiers 31 and 25. A filter which may conveniently comprise a single capacitor 29 is connected to the center tap 35 of the secondary of transformer 37 and to the two rectifiers 31 and 25 so as to provide a substantially unvarying output voltage therefrom.

A second full wave rectifier comprising half wave rectifiers 33 and 23 is also connected to the secondary of transformer 37 so that the polarity of the output voltage therefrom is the opposite to the output voltage from rectifiers 31 and 25. The output voltages of the two full wave rectifiers are mixed by means of mixing resistors 20 and 21 so that an output voltage is derived, the waveform of which is essentially an inverted full wave rectified sinusoid, as shown on the drawing. The two mixing resistors 20 and 21 are connected to base electrode 16 of transistor 1 and center tap 35 is connected to emitter electrode 19.

The operation of the above described embodiment of my invention is as follows. Let it be assumed that the emitter-base voltage of transistor 1 is zero, and that a reference voltage from source 3 of a predetermined magnitude is imposed between emitter 9 and base 7 of transistor 2. The current from emitter 19 of transistor 1 to collector 5 of transistor 2 that flows through the emitter-collector current conduction path of both transistors will be limited by the magnitude of the base current produced by the voltage between emitter 19 and base 16, so that substantially all of the voltage available from D.-C. source 13 appears between emitter 19 and collector 17. As the emitter-base voltage of transistor 1 is increased in accordance with the output voltage from source 18, the current flowing from emitter 19 to collector 5 will gradually increase, but the voltage between emitter 19 and collector 17 will remain at a constant value and the voltage between emitter 9 and collector 5 will be substantially zero.

At a given instant during the rise time of the voltage output of source 18, the current from emitter 19 to collector 5 will be limited by the maximum current that can flow through transistor 2, which current is determined by the magnitude of the voltage imposed between emitter 9 and the base 7 by reference voltage source 3. At this time, there will be a transfer in the voltage drops between emitter and collector of the transistors, substantially all of the voltage drop from source 13 now appearing between the emitter 9 and collector 5 of transistor 2, and substantially zero voltage now appearing between emitter 19 and collector 17 of transistor 1. The current flowing from emitter 19 to collector 5 will remain substantially constant for the duration of the rise time of the voltage output of source 18 and for that portion of the fall time thereof until transistor 1 again begins limiting the current flow through the common emitter-collector current conduction path of the two transistors. At this point, substantially all of the voltage output from source 13 will again appear between emitter 19 and collector 17, and the voltage between emitter 9 and collector 5 of transistor 2 will drop to substantially zero magnitude.

As indicated, the instant during the rise time of the emitter-base voltage of transistor 1 at which transistor 2 will begin limiting current conduction is determined by the magnitude of the output voltage from reference voltage source 3. The duration of the voltage pulse appearing across load 11 may, therefore, be varied by adjusting the magnitude of the output of reference source 3.

Figure 2A:
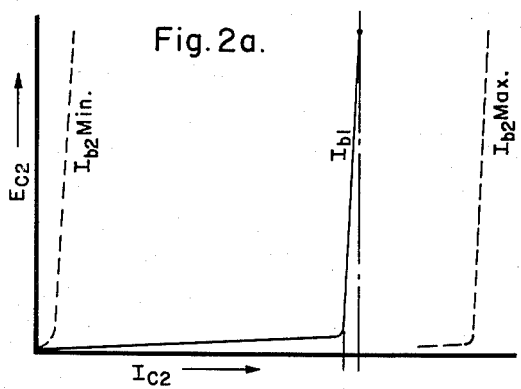
Figure 2B:
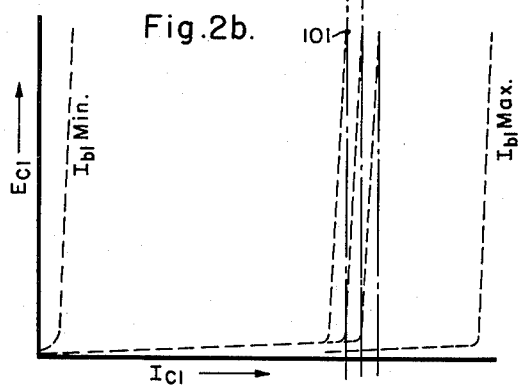
Figure 2C:
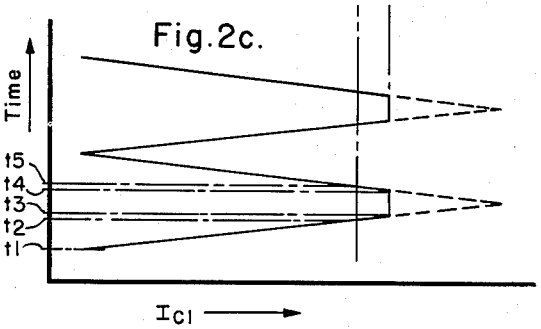

The above described cycle of events is illustrated by Figs. 2a, 2b and 2c. $E_{c1}$ represents that portion of the output of source 13 that appears between emitter 19 and collector 17 of transistor 1, while $E_{c2}$ represents that portion appearing between emitter 9 and collector 5 of transistor 2. $I_{c1}$ and $I_{c2}$ are the collector currents of transistors 1 and 2, respectively, it being apparent from Fig. 1 that the two currents must be identical since the emitter-collector current conduction paths are serially connected across source 13. At time $t_1$, the current flowing between emitter 19 and base 16 is of substantially zero value, since the output from source 18 is a minimum at this time. $I_{c1}$ increases according to its triangular waveform until the instant $t_3$ at which transistor 2 limits the current that may flow through the two transistors, and remains constant until the instant $t_4$ at which transistor 1 again begins limiting current flow. The current through transistor 1 is during the interval between $t_3$ and $t_4$ maintained constant regardless of the magnitude of the voltage imposed between emitter 19 and base 16 by source 18. In effect, a portion of the triangular waveform of $I_{c1}$ that would flow had there been no current limiting action of transistor 2, is clipped off.

At instant $t_2$ immediately before instant $t_3$, $E_{c2}$ begins increasing and $E_{c1}$ decreasing. It is actually at this instant that transistor 2 begins limiting collector current flow through the two transistors. The interval $\Delta t$ between $t_1$ and $t_2$ (see Fig. 3) determines the steepness of the wave front of the output voltage and is dependent upon the steepness of the $E_c$–$I_c$ curve of both transistors. Likewise, during the interval between $t_3$ and $t_4$, the transfer of current conduction between the transistors proceeds according to the $E_c$ vs. $I_c$ characteristics thereof.

It is a well known characteristic of transistors that the gain thereof falls off with increasing emitter-base voltage. This characteristic is discussed in the text Transistors by R. F. Shea, pages 136–141. It has been noted above that the voltage output from source 18 is not truly triangular in waveform, but changes rather rapidly at low magnitudes, inasmuch as it is generally in the form of an inverted, full-wave rectified sinusoid. It has been found that the wave generator 18 has particular merit when used as the emitter-base voltage source for transistor 1, inasmuch as the collector current waveform of transistor 1 becomes essentially triangular in wave shape by virtue of the particular output waveform of source 18. The circuitry simplification obtained thereby is noteworthy and has particular application where weight and minimum operational maintenance are important.

Figure 3:
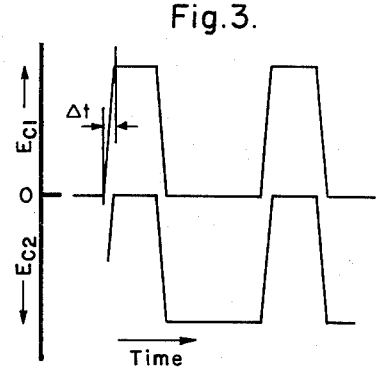
Fig. 3 is a coordinate presentation of emitter-collector voltages of the transistors of Fig. 1 as a function of time.

With reference to Fig. 3, wherein is depicted the simultaneous waveform of the voltage $E_1$ between emitter and collector of transistor 1 and of the voltage $E_2$ between emitter and collector of transistor 2, it can be seen that load 11 may be connected either between emitter 19 and collector 17 of transistor 1 or between emitter 9 and collector 5 of transistor 2. The output waveform $E_1$ appearing across transistor 1 is 180 degrees out of phase with the waveform $E_2$ appearing between emitter and collector of transistor 2, but the pulse duration of both voltages is reversed and determined by the magnitude of reference voltage source 3. Note further that by appropriately varying the output from reference source 3, transistor 2 may be made to limit current conduction at any instant during the cycle of the output voltage of source 18; current limiting may occur when the output voltage from source 18 is of minimum magnitude or it may not occur at all, so that 100 percent pulse-width modulation is readily obtained with a minimum of circuit complexity.

Figure 4:
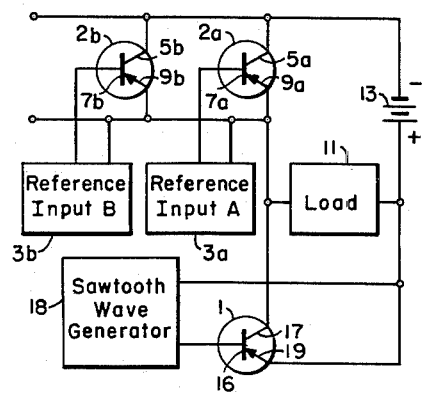
Fig. 4 is a schematic diagram of a modification of the embodiment of my invention depicted in Fig. 1.

The embodiment of Fig. 4 illustrates a modification of my invention wherein the magnitude of pulse-width modulation is determined by the sum of the output voltages of a number of reference voltage sources which are connected to a common terminal. The circuitry is essentially the same as that described with reference to Fig. 1 with the exception that one or more transistors are connected in parallel with transistor 2 to provide a plurality of parallel current paths through which must flow the collector current of transistor 1. The reference voltage sources are individually connected between emitter and base of the individual transistors to control the magnitude of the saturation collector current thereof. As shown in Fig. 4, the collectors 5a and 5b of transistors 2a and 2b are connected to the negative terminal of source 13, and the emitters 9a and 9b of transistors 2a and 2b are connected to collector 17 of transistor 1. Reference input "A" source 1a is connected between emitter 9a and base 7a of transistor 2a, while reference input voltage "B" source 1b is connected between emitter 9b and base 7b of transistor 2b. Any number of additional transistors may be similarly connected in parallel with transistors 2a and 2b with respective reference input voltage sources respectively connected between emitter and base thereof.

The operation of this embodiment of my invention is essentially the same as that of Fig. 1. As the magnitude of control source 18 increases from zero, the current is limited thereby until a point is reached at which both transistor 2a and transistor 2b begin limiting current flow. Although transistor 2a may begin limiting current flow before transistor 2b, transistor 1 will continue to limit current flow until transistor 2b saturates, at which point there will be a voltage transfer as described with reference to Fig. 1. Likewise, as the sawtooth voltage output from source 18 decreases from its peak, transistor 1 will begin limiting current flow. The current that may pass therethrough becomes less than the sum of the current that may pass through transistors 2a and 2b. Inasmuch as the emitter-collector circuits of transistors 2a and 2b are in parallel, they will divide the current from transistor 1 fairly equally until one of them saturates, so that the output voltage appearing across load 11 will be determined by the sum of the saturation currents of transistors 2a and 2b, and thus by the sum of the voltage magnitudes of reference voltage sources 1a and 1b.

The invention is not to be restricted to the specific structural details, arrangement of parts, or circuit connections herein set forth, as various modifications thereof may be effected without departing from the spirit and scope of this invention. For example, the grounded emitter configurations of Figs. 1 and 4 may be replaced by grounded collector or grounded base configurations using teachings well known to the transistor art.

I claim as my invention:

1. A pulse-width modulator comprising: first control voltage source means; second control voltage source means having an output voltage of generally triangular wave shape; first junction transistor means having at least emitter electrode means, base electrode means, and collector electrode means; second junction transistor means of the same conductivity type as said first junction transistor means and having at least emitter electrode means, base electrode means, and collector electrode means; direct current source means connected between the emitter electrode means of one of said first and second transistor means and the collector electrode means of the other of said first and second transistor means, and with the collector electrode means of said one transistor means being coupled to the emitter electrode means of said other transistor means; said first source means being connected between said base and emitter electrode means of said first junction transistor means; said second source means being connected between said base and emitter electrode means of said second junction transistor means; the output of said modulator being taken between the emitter and collector electrodes of either of said transistor means; said second control voltage source means comprising a source of sinusoidal alternating current, first full wave rectifier means connected to said source of alternating current for deriving a full wave rectified-sinusoidal voltage of one polarity therefrom, second full wave rectifier means connected to said source of alternating current for deriving a full wave rectified-sinusoidal voltage of the polarity opposite to said one polarity, filter means connected to the output of said second rectifier means for deriving therefrom a relatively unvarying voltage of said second polarity, and mixing means coupled to said first rectifier means and said filter means for deriving a voltage the waveform of which is instantaneously equal to the sum of the output voltages of said filter means and said first rectifier means, the output voltage of said mixing means being the output voltage of said second control voltage source means.

2. A pulse-width modulator comprising: first control voltage source means; second control voltage source means having an output voltage of generally triangular wave shape; first junction transistor means having at least emitter electrode means, base electrode means, and collector electrode means; second junction transistor means of the same conductivity type as said first junction transistor means and having at least emitter electrode means, base electrode means, and collector electrode means; direct current source means connected between the emitter electrode means of one of said first and second transistor means and the collector electrode means of the other of said first and second transistor means, and with the collector electrode means of said one transistor means being coupled to the emitter electrode means of said other transistor means; said first source means being connected between said base and emitter electrode means of said first junction transistor means; said second source means being connected between said base and emitter electrode means of said second junction transistor means; the output of said modulator being taken between the emitter and collector electrodes of either of said transistor means, said second control voltage source means comprising a first source of full-wave rectified-sinusoidal voltage of one polarity, a second source of relatively unvarying direct current of the opposite polarity, and means coupled to said first source of full-wave rectified-sinusoidal voltage and to said second source of direct current for deriving an output voltage having an instantaneous magnitude equal to the instantaneous sum of said first and second sources, the output voltage of the latter said means being the output voltage of said second control voltage source means.

3. A pulse generating system for generating voltage pulses having a time duration functionally related to the amplitude of the output voltage of a reference voltage source, comprising: first and second junction transistor means each of the same conductivity type and having at least emitter, base and collector electrodes; with at least said second transistor means having a current saturation operating condition and a current limiting operation condition; means coupling said first transistor means in series circuit relationship with said second transistor means so that the collector current of said first transistor means flows through said second transistor means; a source of sawtooth voltage pulses having generally triangular wave shape connected between the base and emitter electrodes of said first transistor means; said output voltage of said source of reference voltage being connected between said base and emitter electrodes of said second transistor means for controlling the operating condition of said second transistor means; and output terminals connected to the emitter and collector electrodes of one of said transistor means.

4. A pulse-width modulator for deriving output voltage pulses from a first control voltage source means and a second voltage source means, said second voltage source means having an output voltage of generally triangular wave shape, said pulse-width modulator comprising: first and second current controlling valve means; each of said current controlling means having at least three electrodes including a control electrode; and with at least said first current controlling means having a first current saturation operation and a second current limiting operation as substantially determined by the voltage coupled between said control electrode and one of said other electrodes; means coupling said first and second current controlling means in series circuit relationship including a source of direct current supply voltage; said first voltage source means being adapted for connection to said control electrode and an adjacent electrode of said first current controlling means for controlling the change in operation of said first current controlling means between said first and second operations; said second voltage source means being coupled to said control electrode and an adjacent electrode of said second current controlling means, and with said output voltage pulses being derived from between two of the electrodes of one of said current controlling valve means.

5. A pulse generating system for generating voltage pulses having a time duration functionally related to the amplitude of the output voltage of a reference voltage source, comprising: first and second junction transistor means each of the same conductivity type and having at least emitter, base and collector electrodes; said first and second transistor means being connected together to form a series current conduction path through the emitter to collector current conduction paths thereof; with at least said second transistor means having a first current saturation operation and a second current limiting operation as determined by the voltage applied between a predetermined pair of its electrodes; a source of sawtooth voltage pulses having generally triangular wave shape connected between the base and emitter electrodes of said first transistor means; said output voltage of said source of reference voltage being connected between said base and emitter electrodes of said second transistor means for controlling the change in operation of said second transistor means between said first and second operations; and output terminals connected to the emitter and collector electrodes of one of said transistor means.

6. A pulse-width modulator comprising: first control voltage source means; second control voltage source means having an output voltage of generally triangular wave shape; first junction transistor means having at least emitter electrode means, base electrode means, and collector electrode means; second junction transistor means of the same conductivity type as said first junction transistor means and having at least emitter electrode means, base electrode means, and collector electrode means; with at least said first transistor means having a first current saturation operating condition and a second current limiting operating condition; direct current source means connected between the emitter electrode means of one of said first and second transistor means and the collector electrode means of the other of said first and second transistor means, the collector electrode means of said one transistor means being coupled to the emitter electrode means of said other transistor means; said first source means being connected between said base and emitter electrode means of said first junction transistor means for controlling the change in operating condition of said first transistor means between said first and second operating condition; said second source means being connected between said base electrode means and emitter electrode means of said second junction transistor means; with the output of said modulator being taken between the emitter and collector electrode means of either of said transistor means.

References Cited in the file of this patent

UNITED STATES PATENTS

| | | |
|---|---|---|
| 2,195,855 | Fitch | Apr. 2, 1940 |
| 2,215,776 | Barnard | Sept. 24, 1940 |
| 2,292,100 | Bliss | Aug. 4, 1942 |
| 2,400,822 | Hansell et al. | May 21, 1946 |
| 2,406,799 | Busignies | Sept. 3, 1946 |
| 2,416,329 | Labin et al. | Feb. 25, 1947 |
| 2,441,418 | Houghton | May 11, 1948 |
| 2,504,849 | Lee | Apr. 18, 1950 |
| 2,589,807 | Higinbotham | Mar. 18, 1952 |
| 2,663,800 | Herzog | Dec. 22, 1953 |
| 2,666,818 | Schockley | Jan. 19, 1954 |
| 2,748,271 | Casey | May 29, 1956 |
| 2,782,372 | Barditch | Feb. 19, 1957 |
| 2,831,126 | Linvill et al. | Apr. 15, 1958 |